United States Patent
Wolf et al.

(10) Patent No.: US 8,111,382 B2
(45) Date of Patent: Feb. 7, 2012

(54) DISTANCE MEASURING UNIT

(75) Inventors: Peter Wolf, Leinfelden-Echterdingen (DE); Uwe Skultety-Betz, Leinfelden-Echterdingen (DE); Joerg Stierle, Waldenuch (DE); Bjoern Haase, Stuttgart (DE); Kai Renz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 12/525,423

(22) PCT Filed: Jan. 24, 2008

(86) PCT No.: PCT/EP2008/050786
§ 371 (c)(1),
(2), (4) Date: Mar. 18, 2010

(87) PCT Pub. No.: WO2008/092790
PCT Pub. Date: Aug. 7, 2008

(65) Prior Publication Data
US 2010/0225896 A1    Sep. 9, 2010

(30) Foreign Application Priority Data
Jan. 31, 2007    (DE) .................. 10 2007 005 725

(51) Int. Cl.
*G01C 3/08* (2006.01)
(52) U.S. Cl. ........ 356/4.01; 356/3.01; 356/4.1; 356/5.01
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| | | | |
|---|---|---|---|
| 5,815,251 A | 9/1998 | Ehbets et al. | |
| 6,137,564 A * | 10/2000 | Schmidt et al. | 356/4.01 |
| 6,624,881 B2 | 9/2003 | Waibel et al. | |
| 6,912,888 B2 | 7/2005 | Stierle et al. | |
| 7,293,366 B2 | 11/2007 | Schulte | |
| 2002/0067475 A1 * | 6/2002 | Waibel et al. | 356/4.01 |

FOREIGN PATENT DOCUMENTS

| | | |
|---|---|---|
| DE | 43 16 348 | 11/1994 |
| DE | 296 15 514 | 1/1997 |
| DE | 100 55 510 | 5/2002 |
| DE | 101 42 166 | 3/2003 |
| DE | 103 44 586 | 4/2005 |
| EP | 0 828 165 | 3/1998 |
| WO | WO 2006/024566 | 3/2006 |
| WO | WO 2007/014812 | 2/2007 |

* cited by examiner

Primary Examiner — Thomas Tarcza
Assistant Examiner — Luke Ratcliffe
(74) Attorney, Agent, or Firm — Merchant & Gould P.C.

(57) ABSTRACT

The invention relates to a distance measuring unit (10) for contactless distance measurement, in particular a handheld unit, with a housing (12, 40), which has a housing front side (14), which points in the measurement direction (32), and a housing rear side (16), which faces away therefrom, wherein the housing rear side (16) forms a first reference plane (AA) for the distance measurement, and with at least one measurement stop (5) of a measurement stop element (4), which can be moved out of the housing (12). The invention proposes that the measurement stop element (46) is mounted in the housing (12, 40) in such a way that it moves automatically out of the housing (12, 40) once a locking apparatus (62, 63, 65) has been released and is optionally moved at least into a first (1) or into a second (1) measurement position.

13 Claims, 5 Drawing Sheets

DISTANCE MEASURING UNIT

This application is a National Stage Application of PCT/EP2008/050786, filed 24 Jan. 2008, which claims benefit of Serial No. 10 2007 005 725.5, filed 31 Jan. 2007 in Germany and which applications are incorporated herein by reference. To the extent appropriate, a claim of priority is made to each of the above disclosed applications.

TECHNICAL FIELD

The invention relates to a distance measuring unit for contactless distance measurement, in particular a handheld unit for the contactless distance measurement.

BACKGROUND

The distance of an object measured from a reference point, whereat the distance measuring unit is positioned with an appropriate measurement stop, is typically measured with such generic distance measuring units. Such distance measuring units can, for example, be designed as laser measuring units, as ultrasonic measuring units or also as high frequency, respectively radar measuring units. In all of the above cases, the distance is determined by direct, respectively indirect, measurement of the elapsed time of a modulated signal sent out from the measuring unit, which is reflected off an object to be measured and subsequently received by the measuring unit.

A distance measuring unit, which can be used for different measuring tasks, is known from the German patent DE 43 163 48 E1. The measuring unit can therefore, for example, be positioned on the reference surface for the frequently encountered application of a measurement starting at an interior surface, as, for example, an inner wall, on the back side of a floor or a ceiling, i.e. with a stop surface facing away from the object. In the event that a measurement is being taken starting at an outer edge, the known distance measuring unit can be positioned on the reference surface with its front side, i.e. with a stop surface facing toward the object, in the direction towards the object to be measured. In the case of the device from the German patent DE 43 163 48 A1, the front and the back side of the unit are configured parallel to each other.

Depending upon the application, either the front side or the back side of the distance measuring unit is defined as the unit-sided reference point, respectively zero point, of the distance measurement.

An electronic distance measuring unit with a transmitter for a measuring beam and a receiver for a returning, reflected beam as well as an evaluation unit for ascertaining the distance from the measuring unit to the point of reflection is known from the German patent DE 296 15 514 U1. Said unit has in each case a measuring spatula on two surfaces, which are situated parallel opposite one another, of its housing, which is configured to have a substantially cuboid form. Said spatulas, which are fastened on the unit housing as to move forwards and backwards and are fixed in guides on both sides of said housing, can on the one hand be retracted to the front face of the unit, respectively can be pulled out in another stable end position to an exactly predefined distance. The position of the measuring spatulas when pulled out is automatically determined by pushbutton switches present in the guides of these spatulas or in the housing wall of the measuring unit and is transmitted to an evaluation unit of the electronic distance measuring unit.

An optoelectronic laser distance measuring unit is known from the German patent DE 100 55 510 A1. Said unit has a planar measurement stop, which can be pulled out of the housing, on its housing rear side facing away from the measuring direction.

SUMMARY

The distance measuring unit according to the invention has the advantage that a measurement stop element of the measuring unit is mounted in the housing in such a way that it moves automatically out of the housing once a locking apparatus has been released and is optionally moved into a first and/or a second measurement position.

Modern distance measuring units are becoming increasingly more compact, the miniaturization of the components of such units having in the meantime progressed to such an extent that the manual operation of mechanical components of the housing requires a certain amount of finger dexterity, respectively auxiliary means.

In the case of the distance measuring unit according to the invention, a measurement stop, which is provided in the unit and defines at least one reference point for the distance measurement with this unit, can automatically, for example at the touch of a button, be extended out of the housing by releasing a locking apparatus so that it is automatically positioned into one of at least two possible measurement positions. When the measurement stop is manually retracted into the unit, said stop is likewise automatically locked up and then remains in its stand-by position. In particular in this case, a housing face, particularly the housing rear side facing away from the measurement direction, constitutes an appropriate reference plane for the distance measurement. In this way, an easy, operator friendly use of a distance measuring unit and in particular of the measurement stop of such a unit is possible. In an advantageous way, the measurement stop element can thereby be moved into a first or alternatively into a second measurement position.

In an advantageous form of embodiment of the measuring unit according to the invention, the measurement stop element is pivotably mounted in the housing of the unit and, when the locking apparatus is released, is automatically pivoted out of the housing into its respective measuring position.

In its first extended, respectively pivoted out, position, the measurement stop element is essentially perpendicular to a first reference plane of the unit, which is formed in particular by the housing rear side of the distance measuring unit.

In this extended first measuring position, the measurement stop element defines, in particular by its apex, a reference point which lies on a plane which is configured parallel to the first reference plane and is spaced apart from said plane.

In an advantageous manner, the measurement stop element defines a reference plane with a second measurement stop, which is configured on the measurement stop element, in said element's second targeted measuring position.

In an advantageous manner, the plane which is spanned by the second measurement stop of the measurement stop element in its second measuring position is the reference plane configured on the housing.

In so doing, the second measurement stop of the measurement stop element in its second measuring position is formed by a stop surface of the measurement stop element facing towards the object to be measured. The stop surface of the measurement stop element in its second measuring position, which faces toward the object, comes thereby to rest in the first reference plane of the housing, in particular of the housing rear side.

In an advantageous manner, the measurement stop element of the distance measuring unit according to the invention is configured essentially planar, in particular lamellar. In so doing, the measurement stop element has a measurement stop which is configured essentially point-shaped.

In an advantageous manner, the measurement stop element of the measuring unit according to the invention has at least one pivot axis which is configured perpendicular to the measuring direction of the measuring unit. In an advantageous embodiment, the distance measuring unit according to the invention furthermore has means for ascertaining the position and/or the pivot angle of the measurement stop element. Via these means, an electronic circuit of the measuring unit can detect the current position of the measurement stop element and transmit the reference plane thereby defined for the distance measurement to an evaluation unit of the measuring unit.

In an advantageous manner, the distance measuring unit according to the invention is configured as an optoelectronic distance measuring unit, in particular as a laser range finder, which can be used as a compact, hand-held distance meter in a plurality of areas of application.

Additional advantages of the measuring unit according to the invention are to be extracted from the following drawing as well as the associated description.

BRIEF DESCRIPTION OF THE DRAWINGS

An example of embodiment of a distance measuring unit according to the invention is depicted in the drawing and shall be explained in detail in the following description. The figures of the drawing, their description as well as the claims contain numerous characteristics in combination. A specialist will also individually consider these characteristics and put them together to form new, additional meaningful combinations.

The following are shown.

DETAILED DESCRIPTION

Figure 1:
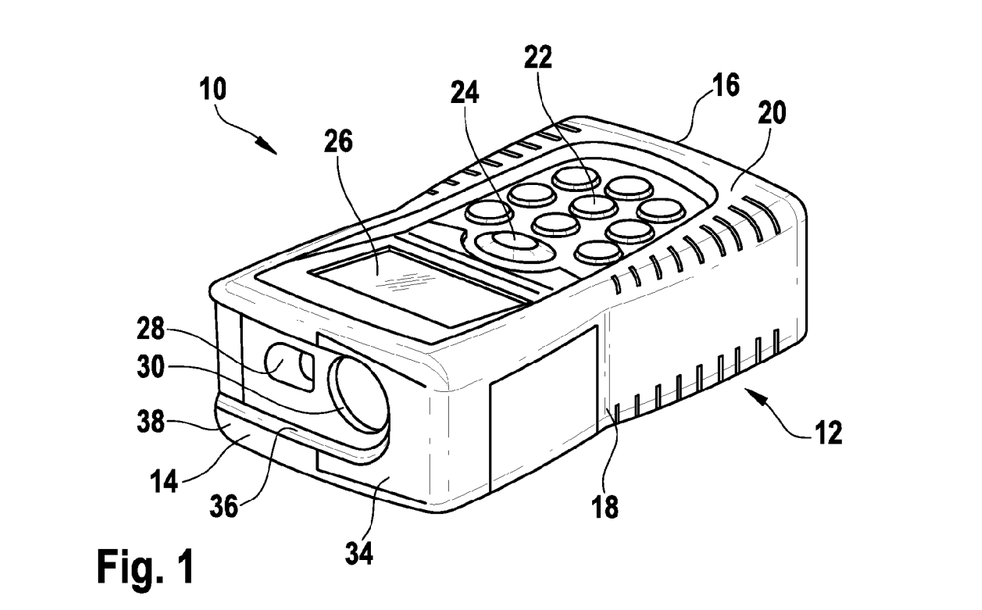
FIG. 1 is a perspective depiction of an embodiment of a distance measuring unit according to the invention in overview.

A distance measuring unit 10 is shown in FIG. 1, which has a housing 12 comprising a housing front side 14 and a housing rear side 16. The housing 12 is configured to have substantially a cuboid form and has however a significant waist 18 in the region of the center of the longitudinal extension of the measurement unit.

Various function keys 22 for switching the unit on and off and for the retrieval of different measuring programs as well as a measuring key 24 to initiate a measuring procedure are arranged on the top side 20 of the housing 12. Furthermore, an output device in the form of a display 26 is located on the top side 20 of the measuring unit 10. A reading which has been ascertained as well as additional information about the selected measuring program can, for example, be displayed via said display 26.

The measuring unit 10 has a measurement signal exit opening 28 for the measuring beam, for example a modulated laser beam, on its housing front side 14. A second opening 30 constitutes the receiving opening for the measurement signal which has been reflected at an object under measurement.

Besides a transmission unit as well as a receiving unit for the measurement signal, an appropriate evaluation unit, which determines the distance of the measuring unit to an object to be measured from the elapsed time of the measurement signal, in particular from a comparative phase measurement of the modulated measurement signal, is located inside the housing.

Figure 2:
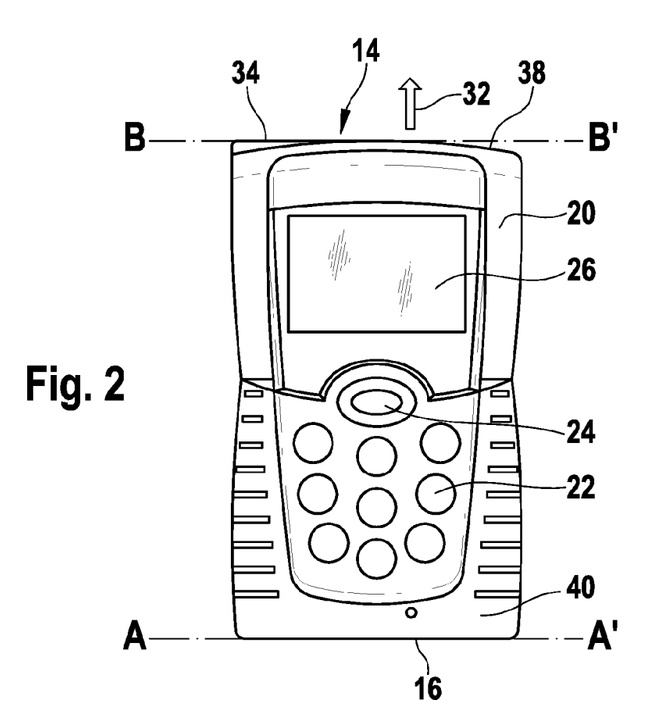
FIG. 2 is a plan view of the distance measuring unit according to FIG. 1.

FIG. 2 shows a plan view of the top side 20 of the housing of the example of embodiment according to FIG. 1.

The housing rear side 16 constitutes a first reference plane AA' for the measuring unit to lie, for example, against a wall. The reference plane AA' formed by the housing rear side 16 essentially extends perpendicular to the measuring direction of the distance measuring unit denoted by arrow 32 in FIG. 2, i.e. except for mechanical tolerances, respectively tolerances obtained in the course of manufacturing.

The housing front side 14 is substantially configured in a curve and has in the region of the measurement signal receiving opening 30 a planar section 34, which defines a reference plane BB' which is parallel to the first reference plane AA'. The planar section 34 of the housing front side is configured on the side of the measurement signal receiving opening 30 which faces away from the measurement signal exit opening 28 and at least partially encompasses the latter, as can be clearly seen in FIG. 1. In this way, the planar section 34 of the housing front side is provided with a recess 36, through which the measurement signal can enter into the measurement signal receiving opening. With the aid of the planar section 34 of the housing front side, the measuring unit can also be laid with its front side 14 on a reference surface without the risk of an operator covering the measurement signal exit opening 28 when said unit is so arranged. In order to prevent an operator from laying the distance measuring unit according to the invention on a reference plane in the region of the measurement signal exit opening 28, for example on an edge, the housing front side 14 is provided with a curved section 38 in the region of the measurement signal exit opening 28 so that it is not possible to arrange the measuring unit parallel to the reference edge.

Figure 3:
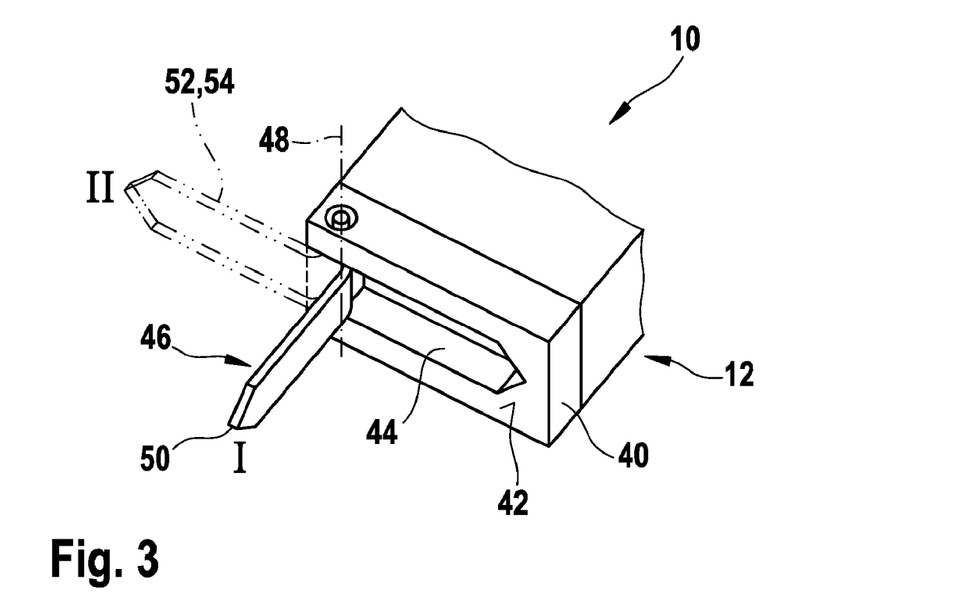
FIG. 3 is a detailed depiction of the rear end of the distance measuring unit according to the invention for the purpose of illustrating the function of the stop element.

FIG. 3 shows the rear end 40 of a laser range finder 10 according to the invention in schematic depiction. With its rear surface, the rear end 40 defines a reference plane AA' of the distance measuring unit according to the invention. A depression, respectively opening wherein the measurement stop element 46 comes to rest in its stand-by position, i.e. in the non-extended state (see also the depiction in FIG. 6a), is embedded into the rear end 40. The measurement stop element 46 is configured essentially planar, respectively lamellar, and can be pivoted around an axis of rotation. If a locking apparatus, which is subsequently described, of the measurement stop element 46 is actuated, in particular released, the measurement stop element moves automatically out of its stand-by position in the opening 44 of the housing of the distance measuring unit according to the invention; and in so doing, said element can optionally take a first measurement position I, respectively a second measurement position II.

In its first measurement position I, the measurement stop element is essentially perpendicular to the reference plane AA' spanned by the rear housing surface 42. In an advantageous manner, the measurement stop element 46 is provided with a substantially tapering end at its end which faces away from the axis of rotation. Said tapering end defines a substantially point-shaped first measurement stop 50. In the first measurement position I of the measurement stop element 46, said element can be applied with its apex against a recessed reference plane, for example a deeper lying groove, a corner of a room, a roller shutter track or against an inner edge, such as, for example, the corner of a window reveal, in order to make a measurement of the distance from the first measurement stop 50 to an object to be measured possible.

The measurement stop element 46 does not thereby have to be manually moved into the measurement position. It moves after a locking apparatus has been actuated, for example: a release key which is driven for example by a spring, into the first measurement position I. In this measurement position I, the measurement stop element 46 is then essentially perpendicular to the reference plane AA' spanned by the rear housing surface 42. When said locking apparatus is further actuated, respectively actuated longer, for example: the release key of the locking apparatus of the measurement stop element is depressed longer, said element moves into a second measurement position II.

In this second measurement position II, the measurement stop element with its surface 52 facing toward the object constitutes a second, in particular planar, measurement stop 54 as a reference plane for a distance measurement. For this purpose, the unit with the surface 52 of the measurement stop element 46, which faces toward the object, can be applied to the reference surface to be measured. In an advantageous manner, the measurement stop 54 constituted by the surface 52 of the measurement stop element 46 which faces the object lies thereby in the reference plane AA' spanned by the rear surface 42 of the housing of the device according to the invention. This advantage can particularly be seen in the depiction of FIG. 6b. Therefore, when measuring a distance with the measurement stop element in its stand-by position, the same reference plane AA' is used on the one hand in the opening 44 of the unit and on the other hand in its second measurement position II.

Figure 4:
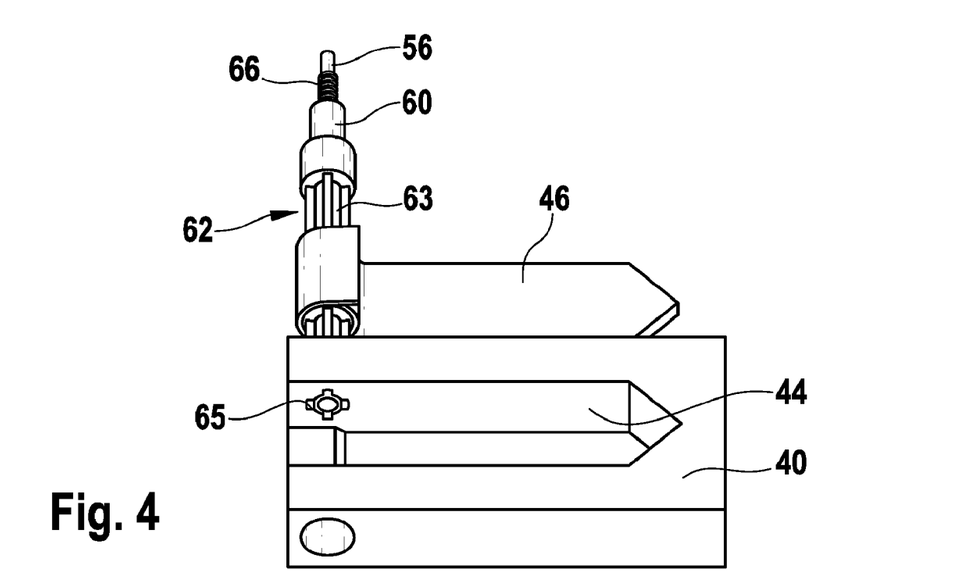
FIG. 4 is an additional detailed depiction of the rear end of a distance measuring unit according to the invention with the measurement stop element removed from the housing.
Figure 5:
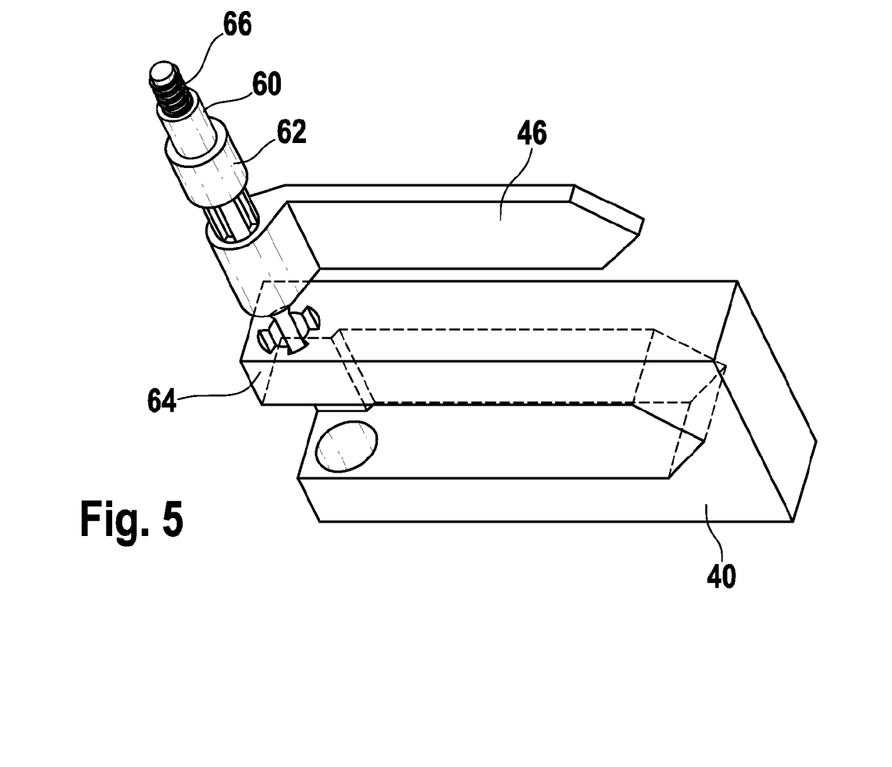
FIG. 5 is an alternative depiction of the rear end of a distance measuring unit as well as the associated measurement stop element and the pivoting mechanism of this measurement stop element.

FIG. 4 shows the rear end 40 of the range finder according to the invention in a depiction, wherein the measurement stop element 46 including the actuating shaft 56 as well as the locking apparatus has been brought out of the housing for better visibility. A first spring element for axially preloading a release button sits on the shaft 56 followed by a sleeve 60 as well as the actual locking mechanism.

In so doing, the mounting arrangement of the movable measurement stop element 46 is connected to the latching mechanism, respectively a locking apparatus. This apparatus allows said element 46 to automatically unlatch and pivot out into the specified measurement position, respectively angular positions of the measurement stop element.

A detent element 63, which is fixedly connected to the pivot shaft 56, can thereby, for example after the production of a pressure in the axial direction of the shaft 56, emerge out of a corresponding fit 65 of the rear end 40 of the housing and release the catch mechanism. The measurement stop element is pivoted a full 90E until the detent element 63 can again engage in openings of the fit 65 which have been correspondingly rotated through 90E. In this measurement position I, the measurement stop element 46 is then essentially perpendicular to the reference plane AA' which is spanned by the rear housing surface 42. When said element 46 is further actuated out of this position, respectively by a longer actuation out of the 0E stand-by position by, for example, exerting pressure longer on the release key of the locking apparatus of the measurement stop element, the measurement stop element moves into a second measurement position II. The measurement stop element thereby locks in each case in a positively-locking manner in the two measurement positions I and II by the detent element 63 engaging in corresponding openings of the fit 65.

Figure 6A:
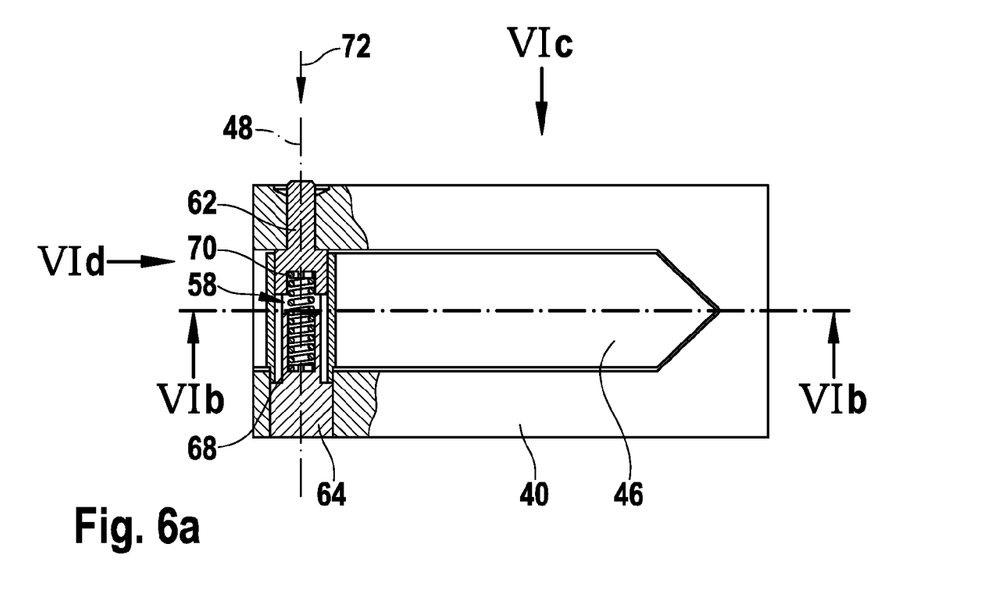
FIGS. 6a to 6f show diverse sectional views through the rear end of a distance measuring unit according to the invention for the purpose of illustrating the function and the configuration of the measuring stop element according to the invention.
Figure 6B:
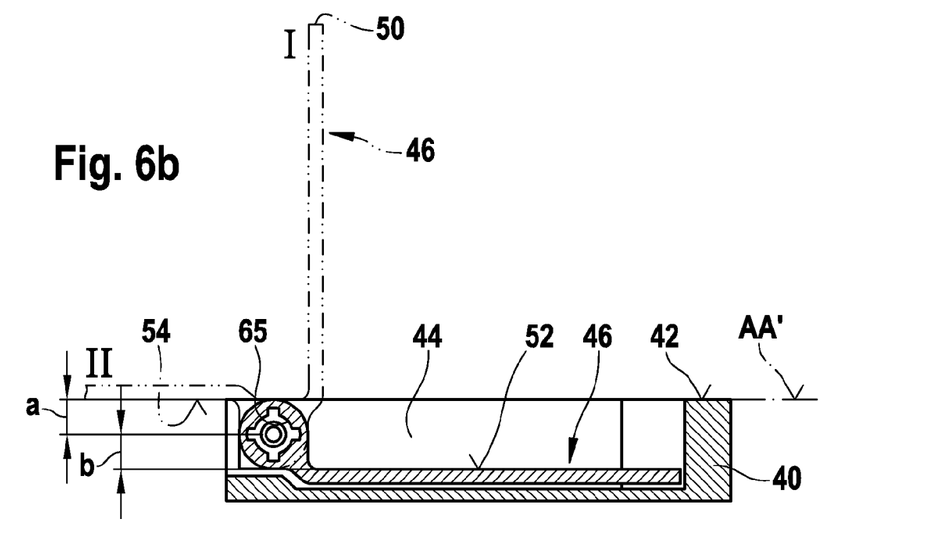
Figure 6C:
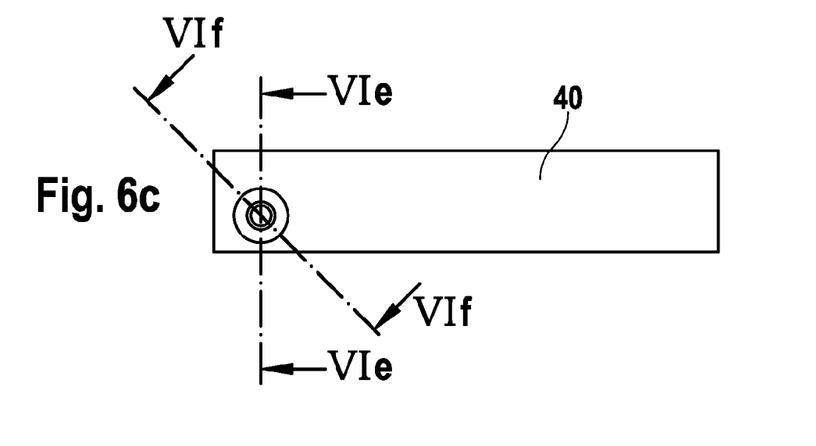
Figure 6D:
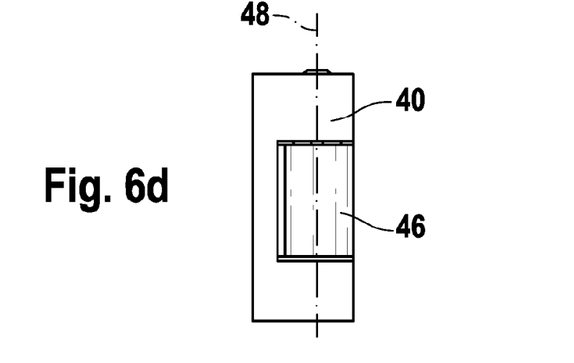
Figure 6E:
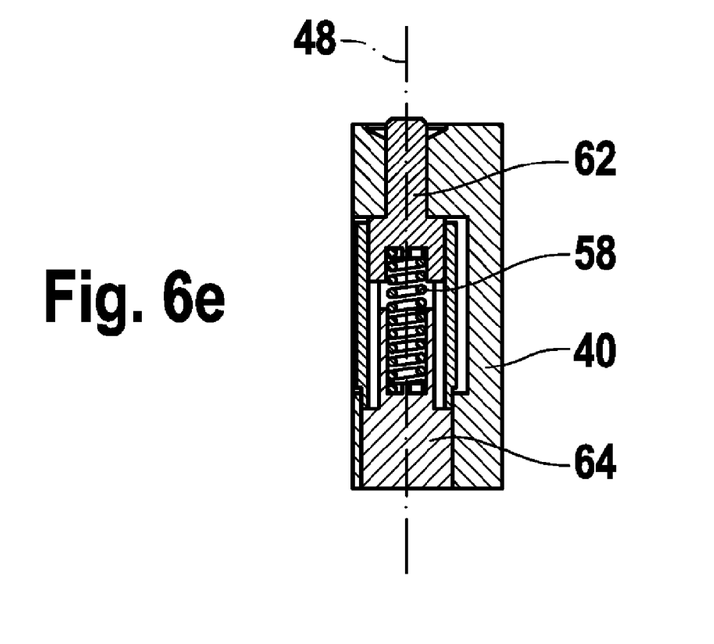
Figure 6F:
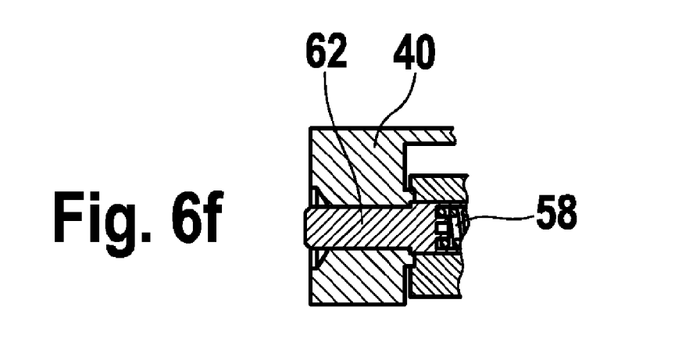

As can be seen in particular in the depictions of the FIG. 6a, respectively FIG. 6e, the locking apparatus comprises in addition to the actuating spring 58, which acts on pressure and torsion, the counter bracket 64 of the spring as well as a locking device 62. In the case of said locking device 62, a detent element 63 which is connected to the pivot shaft 56 can engage in a fit 65, which is fixedly arranged on the housing, in various positions which in each case are separated from each other by 90E as is depicted in FIG. 4 and FIG. 6b. The one end 68 of the actuating spring 58 is thereby connected in a torsion-resistant manner to the counter bracket 64 and consequently to the housing 40. The other axial end 70 of the spring 58 is connected to the locking element 62, in particular with the detent element 63. The measurement stop element 46 is thereby likewise connected in a rotationally fixed manner to the pivot shaft 56 and consequently also to the detent element 63 and is rotatable relative to the housing 40 and in particular relative to the counter bracket 64. The torsional force of the spring 58 pushes the locking element 62 against the housing so that the locking element 62 and the housing 40 are locked against one another. The actuating spring 58 is consequently preloaded with a defined torque in the 0E position depicted in FIG. 6B.

By actuating the locking apparatus, i.e., for example, by the actuation of a corresponding push button in an axial direction 72 of the pivot shaft 56 (see FIG. 6a), the detent element is pushed out of the 0E position of the fit 65, and the connection between the housing 40 and the detent element 63 of the locking element 62 is released. The spring 58 then transfers the prestress moment of force from the housing 40 onto the measurement stop element 46 via the locking element 62.

The measurement stop element 46 pivots as a result out of its zero position in the opening 44 of the housing 40 around the axis of rotation 48 out of the housing 40.

The measurement stop element 46 locks in a positively-locking manner in the two measurement positions I and II. This particularly has the advantage in that the measurement stop element 46 cannot give way in the case of the stop being applied to the measurement plane with a certain pressing force. Were the measurement stop element 46 to give way, it would inevitably lead to an incorrect measuring of the distance measurement.

The movement of the measurement stop element out of its 0E position is cushioned in an advantageous manner. This has the advantage that the locking device has to only once be actuated for unlocking the system. The locking in the next possible angular position, respectively measurement position, automatically occurs by means of the spring force. The detent element 63 can thereby automatically engage in the openings of the fit 65. Out of this first measurement position I, the measurement stop body can then in turn be pivoted into the next angular position, respectively the next measurement position, for example II, by unlocking the system only once.

The pivoting back into the zero position, whereby the measurement stop element again comes to rest completely in the opening 44 of the housing 40, occurs manually by the detent 63, 65 being unlocked and the measurement stop element 46 being pivoted back into the initial position against the spring moment. The detent can be configured so that it automatically unlocks due to the restoring force. An oblique contact element can, for example, be used for this purpose, which, however, should be configured flat enough that a self-locking effect does not occur. The spring is in turn preloaded by the manual restoring movement of the measurement stop element so that the spring is preloaded in its zero position with a defined torque.

The desired cushioned movement can, for example, be implemented by fluid-friction damping, respectively by friction. For this purpose, the clearance between the counter bracket 64 and the locking element 62 can, for example, be filled with a high-viscosity fluid so that a shear clearance filled with fluid forms between the locking element 62 and the measurement stop element 46.

Diverse sectional views of the measurement stop element according to the invention with its locking system are depicted in FIGS. 6a to 6f. As can especially be seen in FIG. 6b, the distance a of the pivot, respectively rotational, axis 48 of the second measurement stop 54 of the measurement stop element 46 to the rear surface 42 of the measuring unit is equal to the distance b of the pivot axis 48 to the interior surface 52 of the measurement stop element 46 if said element 46 in its 0E stand-by position fits in the opening 44 of the housing. In the case of such a configuration of the proportions of the position of the pivot axis to the contact surfaces, the advantage arises that the second measurement stop 54 lies in the plane AA', which is spanned by the rear surface 42 of the measuring unit, in the measurement position II. This means that the same reference plane is used for the 0E stand-by position as well as the 180E measurement position II, so that a position detection for the measurement stop element is basically not required for the measurement position II.

A position detection for the measurement stop element is, however, meaningful for the measurement position I, as said position is likewise indicated in FIG. 6b. This is the case because the first measurement stop 50 comes to rest in this instance in a second reference plane spaced apart from the reference plane AA'. Such a position detection for the measurement stop element can, for example, be implemented by a or a plurality of end position switches or end zone switches or, for example, by a sensing device, in particular a Hall sensor. A corresponding position signal goes then as an input signal to the evaluation electronics of the measuring unit in order to take into account the altered reference point of the measurement during the evaluation of the distance measurement.

The measuring unit according to the invention is not limited to the embodiments depicted in the drawings.

In particular the direction of action of the spring 58 is, for example, not limited to affecting pressure. Furthermore, a locking, respectively latching is also possible in principle, which allows for the position of the measurement stop element to deviate from a 90E grid.

The invention claimed is:

1. A handheld distance measuring unit for contactless distance measurement, comprising:
   a housing including a front side that points in the measurement direction, and a housing rear side that faces away therefrom, wherein the housing rear side forms a first reference plane for the distance measurement and includes at least one measurement stop of a measurement stop element wherein the measurement stop element is mounted in the housing and configured to automatically move out of the housing when a locking apparatus is released and is moved into a first (I) and a second (II) measurement position.

2. The distance measuring unit according to claim 1, wherein the measurement stop element is pivotably mounted in the housing and upon release of the locking apparatus automatically pivots out of the housing into the respective measurement position.

3. The distance measuring unit according to claim 1 wherein the measurement stop element is perpendicular to the first reference plane in the first measurement position (I).

4. The distance measuring unit according to claim 1, wherein the measurement stop element in the first measurement position (I) defines a reference point with the first measurement stop that lies in a second plane parallel to the first reference plane.

5. The distance measuring unit according claim 1, wherein the measurement stop element is parallel to the first reference plane in the second measurement position (II).

6. The distance measuring unit according to claim 1, wherein measurement stop element defines a reference plane with a second measurement stop in the second measurement position (II).

7. The distance measuring unit according to claim 6, wherein the plane spanned by the second measurement stop of the measurement stop element in the second measurement position (II) is the reference plane.

8. The distance measuring unit according to claim 5, wherein the second measurement stop of the measurement stop element is formed by a contact surface facing an object in the second measurement position (II).

9. The distance measuring unit according to claim 7, wherein the contact surface of the measurement stop element that faces an object lies in the first reference plane of the housing rear side in the second measurement position (II).

10. The distance measuring unit according to claim 6, wherein the measurement stop element is planar.

11. The distance measuring unit according claim 1, wherein the measurement stop element comprises at least one pivot axis perpendicular to the measurement direction.

12. The distance measuring unit according to claim 1, further comprising means to ascertain at least one of a position and a pivot angle of the measurement stop element.

13. The distance measuring device according claim 1, wherein the measuring unit is configured as an optoelectronic measuring unit.

* * * * *

UNITED STATES PATENT AND TRADEMARK OFFICE
CERTIFICATE OF CORRECTION

| | | |
|---|---|---|
| PATENT NO. | : 8,111,382 B2 | Page 1 of 1 |
| APPLICATION NO. | : 12/525423 | |
| DATED | : February 7, 2012 | |
| INVENTOR(S) | : Wolf et al. | |

It is certified that error appears in the above-identified patent and that said Letters Patent is hereby corrected as shown below:

Col. 8, line 27, claim 5: "according claim 1, wherein" should read --according to claim 1, wherein--

Col. 8, line 31, claim 6: "wherein measurement stop element defines" should read --wherein the measurement stop element defines--

Col. 8, line 47, claim 11: "unit according claim 1," should read --unit according to claim 1,--

Col. 8, line 53, claim 13: "device according claim 1," should read --device according to claim 1,--

Signed and Sealed this
Sixth Day of November, 2012

David J. Kappos
*Director of the United States Patent and Trademark Office*